(12) United States Patent
Anahid et al.

(10) Patent No.: US 6,360,618 B2
(45) Date of Patent: *Mar. 26, 2002

(54) WEIGHT SENSING SYSTEM

(75) Inventors: Hassan Anahid, Troy; Joseph John Zwolinski, Warren; Liwen Xu; Michael Joseph McKale, both of Troy, all of MI (US)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,509

(22) Filed: Jun. 10, 1999

(51) Int. Cl.[7] ................................................ G01L 1/04
(52) U.S. Cl. ..................................... 73/862.627; 73/774
(58) Field of Search ..................... 73/862.627, 862.041, 73/862.044, 862.381, 760, 768, 774, 775, 786, 795

(56) References Cited

U.S. PATENT DOCUMENTS

| | | | | |
|---|---|---|---|---|
| 5,224,924 A | * | 7/1993 | Urso ............................ | 602/19 |
| 5,571,056 A | * | 11/1996 | Gilbert ......................... | 474/80 |
| 5,810,392 A | * | 9/1998 | Gagnon ........................ | 280/735 |
| 5,865,463 A | * | 2/1999 | Gagnon et al. ............. | 280/735 |
| 5,905,210 A | * | 5/1999 | O'Boyle et al. ........ | 73/862.331 |
| 5,975,568 A | * | 11/1999 | Speckhart et al. .......... | 280/735 |

* cited by examiner

*Primary Examiner*—Max Noori
(74) *Attorney, Agent, or Firm*—Kathryn A. Marra

(57) ABSTRACT

A weight sensing system is provided for use with a seat disposed within an occupant compartment of the vehicle. The weight sensing system includes a sensing mechanism positioned on a seat frame of the seat for measuring a strain on the seat frame due to a seated occupant weight.

10 Claims, 2 Drawing Sheets

WEIGHT SENSING SYSTEM

TECHNICAL FIELD

The present invention relates an occupant weight sensing system suitable for a vehicle occupant restraint system.

BACKGROUND OF THE INVENTION

It is known to provide a passive restraint system, such as a seat belt, to restrain a vehicle occupant. Another known restraint system is an active restraint system, such as an inflatable system. The inflatable restraint system typically includes an air bag stored in a housing module within an occupant compartment in the automotive vehicle, in close proximity to either a driver occupant or one or more passenger occupants. The air bag includes an inflation device and an impact sensing mechanism that deploys the air bag. During deployment, gas is emitted rapidly from the inflation device to deploy and expand the air bag at a predetermined rate to a fully inflated state.

Although the above air bag has worked well, the fixed expansion rate of the air bag does not compensate for variations in occupant size. One technique of compensating for variations in occupant size is to measure occupant size, and adjust the deployment rate accordingly. For example, the weight of the occupant can be estimated using a measuring device such as a strain gauge or a load cell mounted in a load path between the seat and a floor of the vehicle. Another type of measuring device is a fluid-filled bladder placed within the seat. While these types of measuring devices work well, it is desirable to provide a less expensive and more general measuring device which is not specific to a particular style of seat. Thus, there is a need in the art for an occupant weight sensing system that is independent of the type of seat, and accurately correlates with the weight of the occupant.

SUMMARY OF THE INVENTION

It is, therefore, one object of the present invention to provide a weight sensing system that determines the weight of an occupant through seat frame loading. It is another object of the present invention to use a strain gauge to measure a load on the seat frame.

To achieve the foregoing objects, the present invention is a weight sensing system for use in a seat disposed within an occupant compartment of a vehicle. The weight sensing system includes a measuring device positioned on a seat frame of the seat for measuring a strain on the seat frame due to a seated occupant weight.

One advantage of the present invention is that a weight sensing system is provided for a seat that utilizes a strain gauge mounted to a frame portion of the seat to measure the weight of the occupant through seat frame loading. Another advantage of the present invention is that the load applied to a seat suspension of the seat by the occupant can be directly correlated with the weight of the occupant. Still another advantage of the present invention is that the weight sensing system, including the strain gauge, can be incorporated on many different styles of seat frames with minimal modification.

Other objects, features and advantages of the present invention will be readily appreciated as the same becomes better understood after reading the subsequent description when considered in connection with the accompanying drawings.

DESCRIPTION OF THE PREFERRED EMBODIMENT

Figure 1:
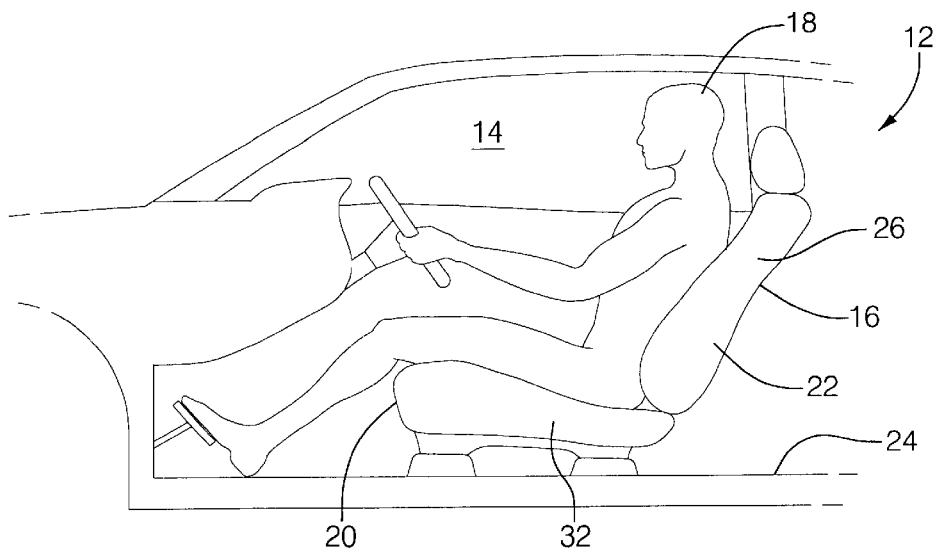
FIG. 1 is an elevational side view of a weight sensing system, illustrated in operational relationship with a seated occupant and vehicle.
Figure 2:
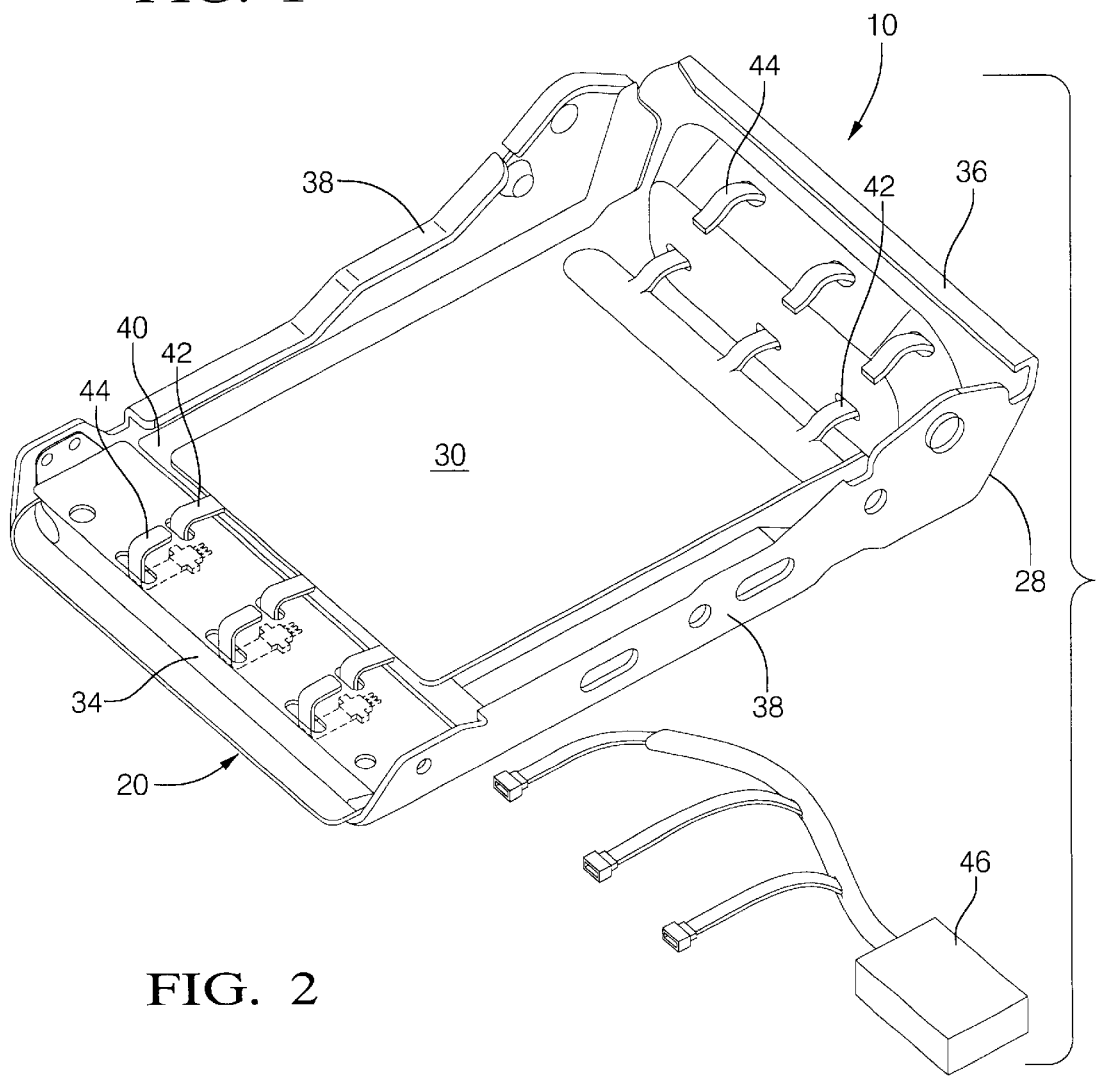
FIG. 2 is a perspective view of a weight sensing system of FIG. 1.
Figure 3:
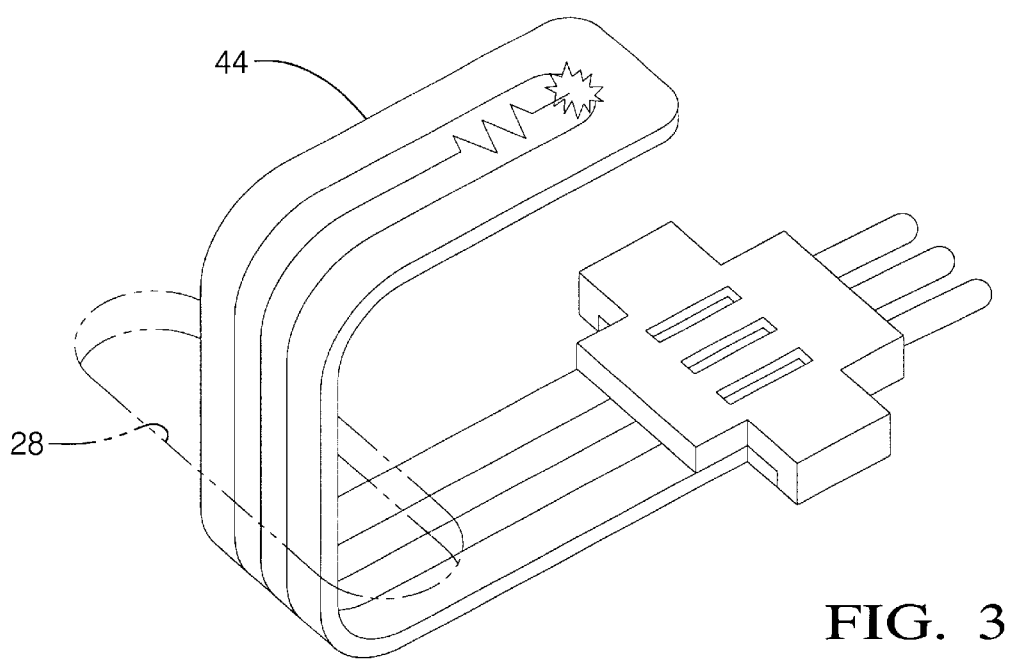
FIG. 3 is a perspective view of a strain gauge for the weight sensing system of FIG. 2.

Referring to the drawings, and in particular FIGS. 1 through 3, one embodiment of a weight sensing system 10, according to the present invention, is shown for a vehicle 12. The vehicle 12 includes an occupant compartment 14 that contains a seat assembly 16 for supporting an occupant 18. It should be appreciated that the seat assembly 16 is of a first row type, as is known in the art.

The seat assembly 16 includes a generally horizontal seat portion 20 connected to a generally vertical or upright back portion 22. The seat portion 20 is secured by suitable means (not shown) to a floor 24 of the vehicle 12. The back portion 22 includes a back frame (not shown), and a padded portion 26 covering the back frame. Preferably, the padded portion 26 is a foam material having a covering on an outer surface thereof, such as cloth, leather, vinyl or the like. The seat portion 20 includes a seat frame 28, a seat support 30, and a padded portion 32 covering the seat frame 28 and the seat support 30. The seat frame 28 is a generally planar, rectangularly shaped member having a front portion 34, a rear portion 36 opposite the front portion 34, and side portions 38 connecting the front portion 34 and rear portion 36. Preferably, a center portion 40 of the seat frame 28 is open.

The seat support 30 is operably positioned over the center portion 40 of the seat frame 28, and applies a load to the seat frame 28 while supporting and distributing the weight of the seated occupant 18. In this example, the seat support 30 is a suspension type system, as is known in the art. The seat support 30 is a generally planar member, operably connected to the seat frame 28 by a flexible member 42. Preferably, the seat support 30 is made from a woven cloth material, having elastic properties and the flexible member 42 is a metal hook. Alternatively, the seat support 30 could be made from a spring wire material arranged in a grid pattern. Preferably, a plurality of hooks 42 connect a front edge of the seat support 30 to the front portion 34 of the seat frame 28, and a plurality of hooks 42 connect a rear edge of the seat support 30 to the rear portion 36 of the seat frame 28.

In operation, the weight of a seated occupant 18 on a seat assembly 16 is distributed by the seat support 30 to the seat frame 28, causing the seat frame 28 to deflect. It should be appreciated that when a occupant 18 sits on the seat assembly 16, a certain percentage of the occupant's 18 weight, such as seventy-five percent (75%), is supported by the seat support 30. The seat support 30 applies a load to the seat frame 28 at a stress concentration point. In this example, the stress concentration point is the point where the seat support 30 is attached to the seat frame 28.

The weight sensing system 10 includes a measuring device 44 positioned at a stress concentration point on the seat frame 28, to measure a strain or deflection of the seat frame 28 resulting from the stress on the seat frame 28 from the weight of a seated occupant 18. Advantageously, positioning the measuring device 44 at the stress concentration point, does not limit the use of the measuring device 44 to a particular style of seat frame 28 and seat support 30. In this example, the deflection of the front portion 34 or rear portion 36 of the frame 28 can be measured, since the seat support 30 is attached at both the front portion 34 and rear portion 36 of the seat frame 28. Preferably, the number of measuring device 44 and their placement is experimentally derived.

Preferably, the measuring device 44 is a strain gauge of the micro type. The strain gauge 44 is an electronic device that changes its resistance in a known manner, when subjected to a strain. In order to measure the change in resistance, a known voltage is applied across the strain gauge 44 and the output voltage is measured using a voltage measurement device such as an electronic module 46. The output voltage correlates directly with the change in strain of the object being measured.

The weight sensing system 10 may also include an electronic module 46 that determines weight the occupant from the preasured strain of the strain gauge 44. The electronic module 46 may also be in communication with an electronic controller (not shown). Advantageously, the electronic controller may determine the weight of the occupant 18 from the measured strain to determine the rate of deployment of an air bag (not shown).

Figure 4:
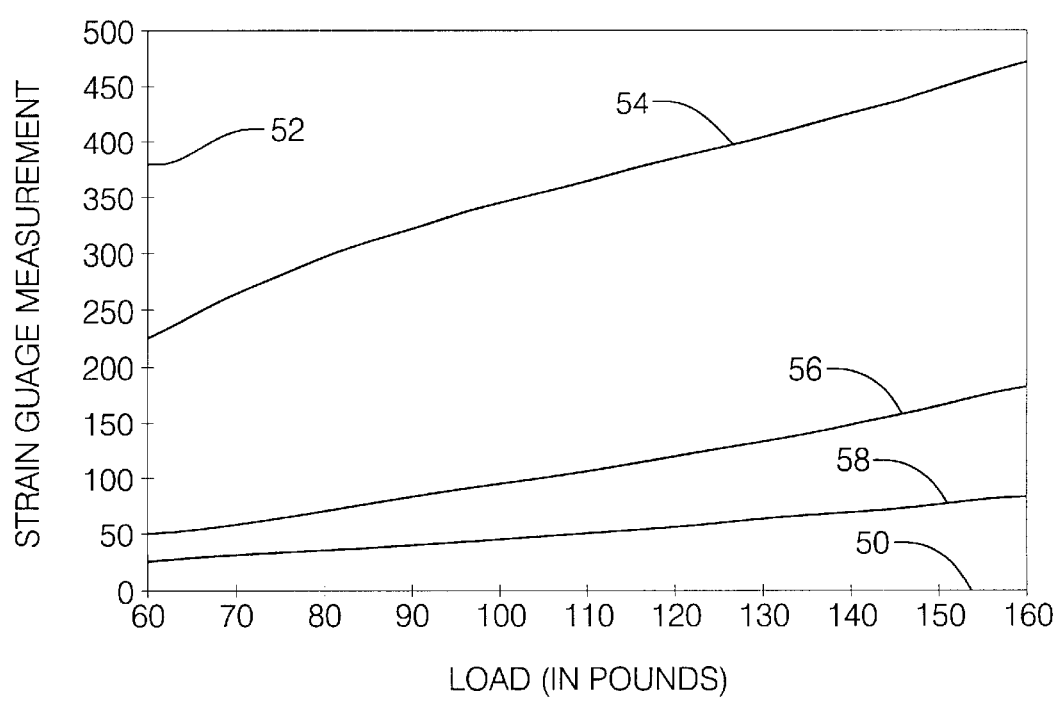
FIG. 4 is a graph illustrating the relationship between the strain gauge measurement and the occupant weight for the weight sensing system of FIG. 2.

Referring to FIG. 4, a correlation between the measured strain or deflection of the seat frame 28 as a result of a load applied to the seat frame 28 from the weight of a seated occupant 18 is illustrated. The x-axis 50 represents an actual load in pounds of a seated occupant 18 on the seat portion 20. The y-axis 52 represents a strain gauge 44 measurement at a stress concentration point. In this example, the measured strain at three different stress concentration points 54, 56 and 58 is illustrated. The resulting measured strain 54, 56 and 58 demonstrates a direct relationship, which in this example is polynomial, between the load applied by the weight of a seated occupant 18 through the seat support 30 to the seat frame 28, and the measured strain 54, 56 and 58. Using this information, the actual weight of the seated occupant 18 can be extracted. Advantageously, the deployment force of the air bag can be adjusted depending on the weight of the seated occupant 18.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A weight sensing system for measuring strain on a seat frame of a seat disposed within an occupant compartment of an automotive vehicle comprising:

a measuring device positioned solely on the seat frame at a stress concentration point thereon for measuring a strain placed on the seat frame due to a seated occupant weight; and an electronic module electrically connected to said measuring device to receive a signal of measured strain from said measuring device for determining the seated occupant weight from the measured strain on the seat frame.

2. A weight sensing system as set forth in claim 1 wherein said sensing mechanism is a strain gauge.

3. A weight sensing system for measuring strain on a seat frame of a seat disposed within an occupant compartment of an automotive vehicle comprising:

a plurality of measuring devices positioned solely on the seat frame at stress concentration points on the seat frame to measure the strain placed on the seat frame caused by a seat suspension of the seat from the weight of the seated occupant; and an electronic module electrically connected to said measuring devices to receive a signal of measured strain from said measuring devices for determining the seated occupant weight from the measured strain on the seat frame.

4. A weight sensing system as set forth in claim 3 wherein said sensing mechanism is a strain gauge.

5. A weight sensing system for measuring strain on a seat frame of a seat disposed within an occupant compartment of an automotive vehicle comprising:

a strain gauge positioned solely on the seat frame at at least one stress concentration point on the seat frame to measure the strain on the seat frame caused by a seat suspension of the seat from the weight of the seated occupant, wherein said seated occupant weight is determined from the measured strain on said seat frame; and an electronic module electrically connected to said strain gauge to receive a signal of measured strain from said strain gauge for determining the seated occupant weight from the measured strain on the seat frame.

6. A method for measuring strain on a seat frame of a seat disposed within an occupant compartment of an automotive vehicle comprising the steps of:

providing at least one measuring device;

positioning the measuring device at a stress concentration point on the seat frame;

measuring the strain placed on the seat frame by a seated occupant with the measuring device; and determining the seated occupant weight from the measured strain on the seat frame.

7. A method as set forth in claim 6 wherein said step of positioning comprises positioning the measuring device closely adjacent a location at which a seat support is attached to the seat frame.

8. A method as set forth in claim 6 wherein said step of measuring comprises measuring the strain in the seat frame at a stress concentration point on the seat frame.

9. A method as set forth in claim 6 including the step of providing an electronic controller electrically connected to the measuring device for determining the seated occupant weight from the measured strain on the seat frame.

10. A method for measuring strain on a seat frame of a seat disposed within an occupant compartment of an automotive vehicle comprising the steps of:

providing at least one strain gauge and an electronic controller electrically connected to the strain gauge;

positioning the strain gauge closely adjacent a location of which a seat support is attached to the seat frame to form at a stress concentration point on the seat frame;

measuring the strain placed in the seat frame at a stress concentration point on the seat frame by a seated occupant; and determining the seated occupant weight from the measured strain on the seat frame.

* * * * *